UNITED STATES PATENT OFFICE.

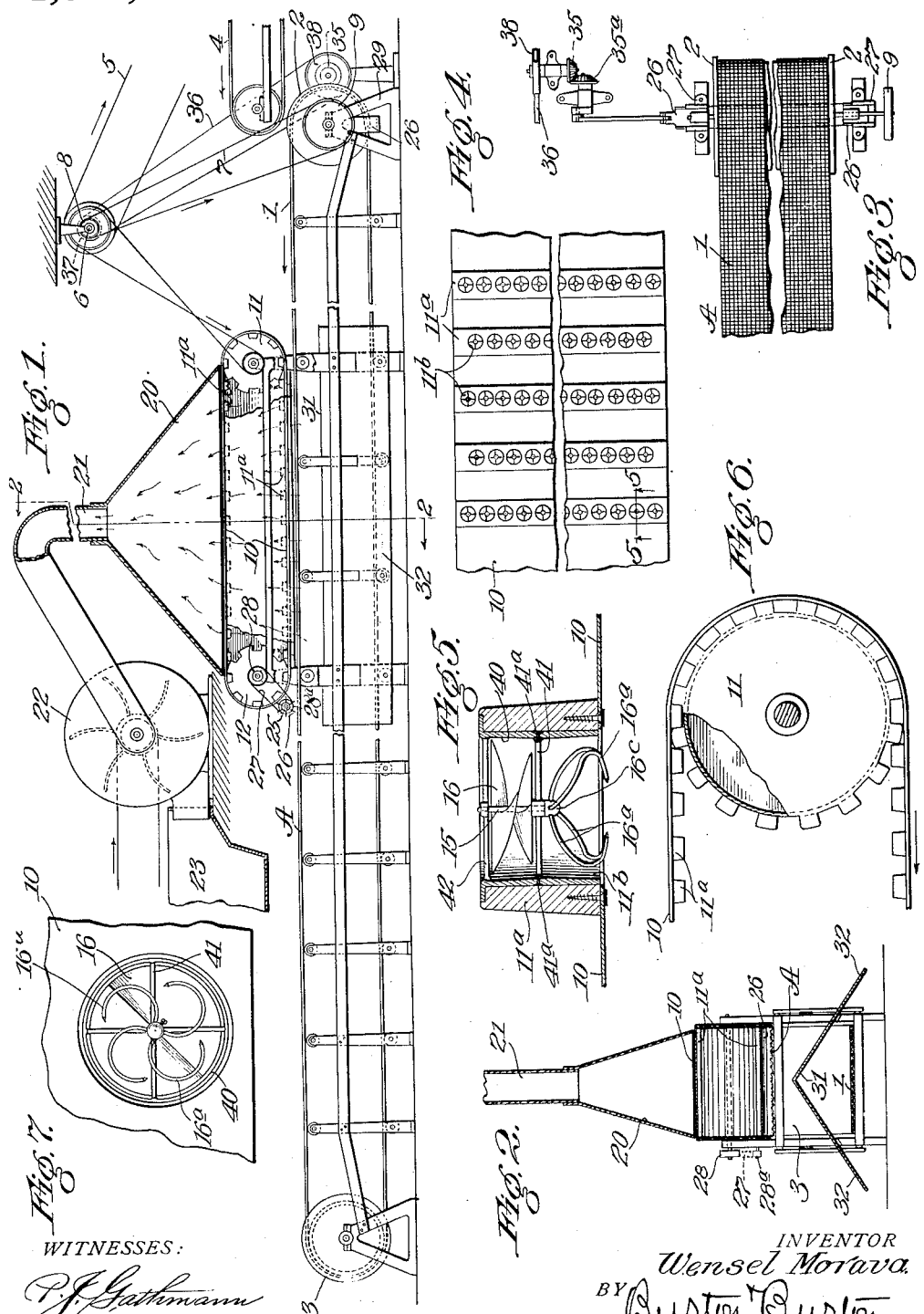

WENSEL MORAVA, OF CHICAGO, ILLINOIS.

COTTON-CROP-SEPARATING MACHINE.

1,356,545.  Specification of Letters Patent.  Patented Oct. 26, 1920.

Application filed February 24, 1920. Serial No. 360,965.

*To all whom it may concern:*

Be it known that I, WENSEL MORAVA, a citizen of the United States, residing at Chicago, in the county of Cook and State of Illinois, have invented certain new and useful Improvements in Cotton-Crop-Separating Machines, of which the following is a specification, reference being had to the accompanying drawings, forming a part thereof.

The purpose of this invention is to provide an improved construction for the purpose of separating from the croppings of cotton plants,—comprising opened and unopened bolls, leaves, twigs, and the like, in an indiscriminate mixture,—the fiber from the open bolls and that already separated from the hulls and scattered throughout the cropping mixture, and to permit the separation readily of the unopened bolls from the residue of the croppings remaining after the freed fiber and that of the open bolls has been separated. It consists in the elements and features of construction shown and described, as indicated in the claims.

In the drawings:—

Figure 1 is a sectional side elevation of a structure embodying this invention, section being made through the air conduit mouth-piece and separating device in vertical plane longitudinally of the main conveyer and separating device.

Fig. 2 is a section at the line, 2—2, on Fig. 1.

Fig. 3 is a detail plan view of a portion of the conveyer showing also means for transverse agitation of the conveyer.

Fig. 4 is a detail view of a portion of the endless belt showing the arrangement of the separating devices thereon.

Fig. 5 is a detail section on a large scale at 5—5 on Fig. 4.

Fig. 6 is a detail end elevation of one of the carrying drums of the separating device, and a portion of the endless belt thereof, the head of the drum being partly broken away to show structure.

Fig. 7 is a plan of a detail.

It is well known that the fiber-containing bolls of the cotton plant, ripen, causing the opening of the bolls releasing the fiber, at different stages, the ripening commencing at the lower part of the plant and advancing upward; so that at any given stage in the process after the ripening commences at the lower bolls, there are upon the plant bolls in all degrees of opening, from those fully open at the lower part of the plant, to those entirely closed upon the upper branches. This characteristic of the cotton plant has very largely defeated or prevented the use of automatic gathering mechanism for taking the fiber from the plant without inter-mixture of other parts of the plant, because any mechanism which travels over the field for operating upon the first-ripened bolls at the lower part of the plant, is liable to injure the plants and break off the upper branches and twigs containing unopened bolls. And if the cropping is delayed until the upper bolls are ripened, there is liable to be loss of fiber from the lower bolls dropping out and being blown away. On this account it has been proposed to crop the entire plant as soon as the lower bolls are opened, the upper bolls being usually by that time sufficiently developed to perfect the fiber therein, though unopened. The cropping in that case will comprise all the material that will be stripped from the bush by means passing over it with sufficient force to detach the unopened bolls; and said cropping therefore includes opened and unopened bolls, bush fragments, twigs and leaves in an indiscriminate mixture which requires manipulation for separating the loose fiber, and that which may be detached from the open bolls, from the hulls, unopened bolls, twigs and leaves which are gathered therewith.

Such separation is the purpose of the machine shown in the drawings and comprises a conveyer, A, which consists of an endless belt of open wire mesh, 1, the desirable size of the mesh being about three-quarters of an inch, such belt being carried around pulleys or drums at opposite ends, 2 being the drive drum and 3 the idler drum. Any suitable provision may be made for delivering croppings onto the receiving end of the belt. The drawings show for this purpose a feeding conveyer, 4, which may be operated in any convenient manner indicated by the belt, 5, from a pulley on the counter-shaft, 6. From the same counter shaft belt, 7, passing around a pulley, 8, on the counter shaft and a pulley, 9, on the shaft of the driving drum of the conveyer, A, gives to said conveyer a slow movement for carrying the material delivered upon its upper ply away from the feed belt. Overhanging the conveyer, A, for a relatively short portion of its length, there is situated the device for separating the fiber from the residue of the croppings. This device consists of an endless belt, 10, carried around drums, 11 and 12, between side casing walls, 13, said belt being of suitable material, as canvas, to be substantially or approximately impervious to the air, said belt having a multiplicity of apertures in transverse rows covered by wooden bars, 11ª, having apertures 11ᵇ, registering with those of the belt, and having in each of said apertures a rotor, comprising a vaned shaft, 15, having oblique vanes, 16, so that the device will be rotated by a current of air passing through the apertures in which the rotor is situated. The vaned portion of the rotor is situated in the upper part of the aperture, and in the lower part of the aperture, the rotor shaft carries spirally-shaped hooks, 16ª, adapted to engage and entangle the fiber of the cotton as the rotor is rotated in the presence of such fiber. This endless belt with the multiplicity of transverse slats or bars, 11, each having a plurality of rotors mounted in its apertures, as described, is mounted in the lower end of the funnel-shaped mouth-piece, 20, of an air conduit, 21, so that the endless belt operates substantially as a closure for said mouth-piece. Means is provided represented conventionally by a fan, 22, for producing a current inward through the mouth-piece. This air current is restricted to the passages afforded for air through the apertures 11ᵇ, in the bars, 11ª, in which are mounted the rotors, 15, 16, and thereby causes rotation of said rotors in both the upper and lower ply of said endless belt. The lower ply of said belt overhangs at a very short distance the upper ply of the conveyer belt, 1, and the current of air drawn up through said conveyer,—consisting, as above mentioned, of open mesh wire fabric, having apertures three-quarters of an inch in each dimension,—operates to lift the loose fiber and the open bolls to the lower entrance of the apertures, 11ᵇ, in the bars, 11ª, and the fiber is thereby brought into position for engagement with the rotating spiral hooks, 16, at the lower end of the several rotors, and being entangled therewith is held and carried along with the said lower ply of the belt, 20, to the idler drum, 12. Upon passing onto the idler drum, and being thereby out of the path of the air current, the rotors cease their rotation, and as the bars, 11ª, pass up around the drum, the fiber engaged by the spiral fingers of the rotor, carrying in some instances the undetached bolls or hulls, is exposed to the action of a rotating tapper, 25, consisting of a shaft having flat vanes, 26, and rotated at a comparatively high speed by means of a belt, 27, driven by the pulley, 28, on the shaft of the idler drum, 12, and passing around a small pulley 28ª, on the shaft of the tapper, 25. And thereby the hulls and any loose twigs which may be more or less held by the fiber, are disengaged therefrom. When the belt has passed up around the idler drum and begins to move off therefrom in its return travel in the upper part, the rotors in the apertures of the bars, 11ª, are again exposed to the ascending air current and rotated, but now in the opposite direction from that in which they were rotated while following the lower course of the belt, and in this reverse rotation, the fiber which has been engaged by the spiral fingers is disengaged therefrom, that is to say, the spiral fingers being unscrewed from the fiber; and the fiber is engaged by the ascending air current and carried up through the air conduit, 21, and delivered through the fan, 22, to a receptacle indicated by a hopper, 23.

It is designed that the detached hulls and other refuse contained in the cropping, shall be sifted therefrom while it is carried on the conveyer, A; and to effect this sifting the conveyer which has, as above stated, a slow movement of travel, is given a comparatively rapid joggling movement transverse to the direction of travel, by suitable means acting on the driving drum, 2. Such joggling may be effected by means of bevel gears, 35, 35ª, deriving their movement from the counter shaft, 6, by belt, 36, passing around pulleys, 37 and 38, respectively, on the counter shaft and the shaft of the bevel gear, 35. For the purpose of adapting them to be thus reciprocated, the two bearings of the shaft, 2ª, of the driving drum of the conveyer, A, are mounted upon a bar, 26, which is provided with slide bearings at 27, in the supporting frame or standard, 29.

In order that the refuse material, 15, falling through the upper ply of the conveyer, A, may not lodge on the lower ply and be carried around between said ply and the idler drum, there is provided a delivery chute or deflector, 31, comprising two chuteboards, 32, meeting at an apex about midway in the distance between the upper and lower plies of the conveyer, the lower edges of said chute boards extending out over and beyond the lateral edges of the lower ply, and delivering the material which passes through the upper ply into any convenient receptacle, not shown.

For convenience in constructing the separator, consisting of the endless belt, 10, having the apertured bars, 11ª, provided with the air-operated rotors with their fiber-engaging hooks, 16ª, said rotors are severally mounted in sleeves or tubes, 40, adapted to be fitted into the apertures in the bars, 11ª, so that the whole rotor may be made complete apart from the bars and may be readily removed therefrom for any repairs. The tubes have each midway in their length a spider, 41, affording the lower bearing for the spindle or shaft of the rotor and hooks. An upper spider, 42, is permanently secured to the tube; and the rotor being made with vanes fixed on the rotor shaft, the lower end of the shaft is inserted in the central bearing in the lower spider. The spiral hooks are formed as arms projecting from a hub, 16°, which is adapted to be secured by a set screw upon the lower end of the spindle after the same has been inserted through the lower spider; and the parts of the device comprising said lower spider, rotor hooks, may then be entered through the lower end of the tube, the upper end of the spindle being entered in the central bearing of the upper spider. The lower spider is then secured in place by screws, 41ª, set in from the outside into the ends of the spider arms. The tubes may be flanged at the upper end so that they hang in the apertures; and they are desirably made snugly fitted to the apertures in the bars, so as to require no other means of securement. The described details of construction of the rotor for mounting in the bars are preferential only and not essential to the invention, other details of construction and other means of securing the rotors in position being permissible.

I claim:—

1. In combination with a support for cotton croppings comprising the variously conditioned parts to be separated, an endless belt device overhanging the croppings on the support; a multiplicity of tubular throats carried by the belt and registering with the openings through the latter; vaned rotors in said throats, and fiber-engaging means carried by said rotors respectively at the ends of the throats toward the support; means for producing an air current upwardly through said throats to operate on the vanes for rotating fiber-engaging means; means for propelling the endless belt in its endless path, and a funnel overhanging the upper ply of the belt through which the air is propelled for producing said current.

2. In the construction defined in claim 1, the support being a conveyer extending in its path of conveying movement beyond the area overhung by the endless belt device; means for propelling said conveyer and means for delivering the cropping thereonto at a portion of its length anterior in its said path of movement to said overhanging belt device.

3. In the construction defined in claim 1, foregoing, the support being reticulated for easy passage of air current therethrough, the openings being adapted for the passage of hulls and twigs therethrough.

4. In the construction defined in claim 1 foregoing, the support being an endless conveyer reticulated for screening the material carried by it; means for propelling the conveyer in its endless path, and means for giving it a relatively quick or sudden reciprocating movement transverse to its endless path.

5. In the construction defined in claim 1, the support being an endless conveyer reticulated for screening the material carried by its upper ply; a deflector interposed between the upper and lower plies of said conveyer, for delivering laterally thereof and from therebetween the material which passes through the upper ply.

6. In the construction defined in claim 1 foregoing, the support being a slowly moving conveyer extending for a considerable distance beyond the overhanging device at the side of the latter toward which the conveying surface travels; whereby the portion of the conveyer so extending serves as a sorting table for separating by hand-picking the different materials thereon.

7. A device for separating the diverse parts of cotton croppings comprising a mouthpiece of an air conduit; a closure member for said mouth-piece having apertures forming air paths through it; obliquely vaned rotors mounted in said apertures having their shafts or spindles transverse to the plane of closure; fiber-engaging means on said spindles adapted for engaging the cotton fibers by rotation of the spindles in one direction and for disengagement therefrom by rotation in the opposite direction, and means for reversing the closure to cause it alternately to present the opposite ends of the rotors toward the incoming air currents, to cause them to alternately rotate in opposite directions and alternately engage and disengage the fiber.

8. In the construction defined in claim 7 foregoing, the closure being an endless belt, whereby it comprises two plies which face respectively upward and downward, and means for actuating it in the endless path of its extent, said construction constituting the means for reversing said closure with respect to the direction of the air movement through the conduit.

9. In the construction defined in claim 7 foregoing, the closure being an endless flexible belt having transverse bars secured at intervals in its length; the air apertures being apertures through said bars, and the rotors being made individually complete with their vanes and fiber-engaging means, comprising each a sleeve fitted to occupy one of said apertures having spiders for journaling the rotor spindles, one of said spiders being between the vanes and the fiber-engaging means of the spindle.

10. A device for separating the diverse parts of cotton croppings, comprising a mouth-piece of an air conduit; an endless belt positioned to serve as a closure for said mouth-piece, said belt having a multiplicity of apertures and having mounted in each aperture a vaned rotor carrying at its outer end a fiber-engaging means; a conveyer for fibrous and non-fibrous material to be separated, mounted for travel below the endless belt, and means for producing an air current inward through said mouth-pieces; whereby the vaned rotors are rotated in one direction in the lower ply for engaging the fibrous material, and in the opposite direction in the upper ply for releasing said fibrous material, and a tapper operating at the up-turn of the endless belt at the farther side of its travel for jarring the fiber-engaging means to release therefrom any non-fibrous material carried thereby, in the interval between said opposite rotations between said fiber-engaging means.

In testimony whereof, I have hereunto set my hand at Chicago, Illinois, this 20th day of February, 1920.

WENSEL MORAVA.